(12) United States Patent
Selin et al.

(10) Patent No.: US 7,917,639 B2
(45) Date of Patent: Mar. 29, 2011

(54) MULTIMEDIA APPLICATION INTERFACE

(75) Inventors: Jari Selin, Helsinki (FI); Pekka Pessi, Helsinki (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/516,284

(22) PCT Filed: May 31, 2002

(86) PCT No.: PCT/IB02/02935
§ 371 (c)(1),
(2), (4) Date: Feb. 9, 2005

(87) PCT Pub. No.: WO03/103250
PCT Pub. Date: Dec. 11, 2003

(65) Prior Publication Data
US 2005/0160152 A1    Jul. 21, 2005

(51) Int. Cl.
*G06F 15/16* (2006.01)
(52) U.S. Cl. ........ 709/229; 709/203; 709/223; 709/228; 719/328
(58) Field of Classification Search .................. 709/203, 709/217, 219, 226–230, 223; 379/201; 375/240.25, 375/240.2; 719/328
See application file for complete search history.

(56) References Cited

U.S. PATENT DOCUMENTS

| | | | | |
|---|---|---|---|---|
| 5,473,680 A | * | 12/1995 | Porter | 379/221.15 |
| 6,078,942 A | * | 6/2000 | Eisler et al. | 718/100 |
| 6,393,496 B1 | * | 5/2002 | Schwaderer et al. | 719/328 |
| 6,445,776 B1 | * | 9/2002 | Shank et al. | 379/88.1 |
| 6,463,078 B1 | * | 10/2002 | Engstrom et al. | 370/466 |
| 6,687,747 B1 | * | 2/2004 | Huang et al. | 709/223 |
| 6,891,893 B2 | * | 5/2005 | Sullivan et al. | 375/240.25 |
| 6,940,912 B2 | * | 9/2005 | Sullivan et al. | 375/240.26 |
| 6,987,765 B2 | * | 1/2006 | March et al. | 370/392 |
| 6,988,143 B2 | * | 1/2006 | O'Neill et al. | 709/230 |
| 2001/0003191 A1 | * | 6/2001 | Kovacs et al. | 709/226 |
| 2001/0036176 A1 | * | 11/2001 | Girard | 370/352 |
| 2002/0032806 A1 | | 3/2002 | Machin et al. | |
| 2002/0065952 A1 | * | 5/2002 | Sullivan et al. | 709/328 |
| 2002/0105943 A1 | * | 8/2002 | Womack et al. | 370/352 |
| 2002/0156900 A1 | * | 10/2002 | Marquette et al. | 709/227 |
| 2002/0176404 A1 | * | 11/2002 | Girard | 370/352 |
| 2003/0037174 A1 | * | 2/2003 | Lavin et al. | 709/313 |
| 2003/0163602 A1 | * | 8/2003 | Johnson et al. | 709/328 |
| 2005/0071459 A1 | * | 3/2005 | Costa-Requena et al. | 709/224 |

FOREIGN PATENT DOCUMENTS

| | | |
|---|---|---|
| WO | WO 00/33534 | 6/2000 |
| WO | WO 01/78358 A2 | 10/2001 |
| WO | WO 0178358 A2 * | 10/2001 |
| WO | WO 02/09387 | 1/2002 |

(Continued)

OTHER PUBLICATIONS

Rosenberg J. et al., "An Offer/Answer Model with SDP", draft-ietf-mmusic-sdp-offer-answer-01.txt, Feb. 2002.*

(Continued)

*Primary Examiner* — Oanh Duong
(74) *Attorney, Agent, or Firm* — Mintz, Levin, Cohn, Ferris, Glovsky & Popeo, P.C.

(57) ABSTRACT

An improved application programming interface (API) as described can control media resources in numerous Internet multimedia applications. The API may be independent of the application itself and the media resources underneath. The API may be referred to as a multimedia subsystem (MSS) interface.

25 Claims, 5 Drawing Sheets

FOREIGN PATENT DOCUMENTS

WO     WO 02/15627     2/2002

OTHER PUBLICATIONS

John-Luc Bakker et al, "Next Generation Service Creation Using XML Scripting Languages" Telcordia Technologies, Jan. 22, 2002, XP002227266, retrieved from the Internet: URL:http://www.agreenhouse.com/papers/jlbakker/bakker-JCC2002.pdf.

Zou et al, "Prototyping SIP-based VoIP Services in Java", ICC 2002, [Online] 2000, XP002227267, Retrieved from the Internet: URL:http:wwwifip.or.at/con2000/icct440.pdf.

* cited by examiner

MULTIMEDIA APPLICATION INTERFACE

FIELD OF THE INVENTION

The present invention relates to IP multimedia applications for controlling media, and particularly to the connection of the control and media parts thereof.

BACKGROUND TO THE INVENTION

Multimedia applications are increasingly utilised, particularly in mobile wireless applications.

It is necessary for any multimedia application to control media resources via an interface, termed an application programming interface (API).

A problem with controlling media is that the interface is usually implemented with a very different API in different applications. This adds to the cost of development and maintenance of multimedia applications, and also reduces the flexibility of multimedia applications.

It is an object of the present invention to provide an improved multimedia application interface.

SUMMARY OF THE INVENTION

In accordance with the present invention there is provided a method of controlling the provision of media resources to a media application, in which said method is independent of the media application and the media resources.

Preferably, the provision of media resources is dependent upon characteristics of the media session.

Preferably, there is further provided an interface between the media application and the media resources.

The method may further comprise receiving, at said interface, a signal identifying the characteristics of the media session.

Responsive to said signal, the media resource preferably determines if the media session is to be supported. The media resource preferably determines the characteristics of the support for the media session. The characteristics of said support may be determined by the characteristics of the media session in the received signal, and the characteristics of the media resource capability.

The signal identifying the characteristics of the media session may be based on a session description protocol (SDP).

Said signal may be generated by said media application responsive to a request for a media session from a remote media application.

Said request may be based on a session description protocol (SDP).

Said signal may be generated by said media application responsive to a media session being initiated by the media application.

Communication between the media application and the media resources may be based on any one of: a session description protocol; an extended mark-up language, or a real-time stream protocol.

The media resources configurations and objects may be identified using a hierarchical naming scheme.

The media session may be one of either a multicast session or a unicast session.

The media application may be associated with a Windows or a Linux operating system, or any other operating system. The invention is not operating system dependent.

The present invention also provides an interface for controlling media resources provided to a media application, in which said interface is independent of the application or the media resources.

The interface is preferably adapted to receive a signal from the media application identifying characteristics of a media session.

The media resources are preferably adapted to be responsive to said signal to determine if the media session is to be supported.

The media resource may be adapted to determine the characteristics of the support required for the media session.

The characteristics of said support may be determined by the characteristics of the media session in the received signal, and the characteristics of the media resource capability.

The signal identifying the characteristics of the media session may be based on a session description protocol (SDP).

Said signal may be generated by said media application responsive to a request for a media session from a remote media application.

Said request may be based on a session description protocol (SDP).

Said signal may be generated by said media application responsive to a media session being initiated by the media application.

The API in accordance with the present invention thus allows multimedia applications to control media resources via a common interface. The interface is suitable for different applications, ranging from handheld terminals providing voice-over-IP service, to streaming servers and PSTN gateways.

The inventions allows for general media control in various applications. Advantageously, this reduces the cost of development and maintenance.

The interface can be used in a similar fashion to control very different kinds of media services. For, example, the interface may be used to control Public Switched Telephone Network (PSTN) gateway and media sessions of Surf audio/video terminal. These two applications are opposite extremes considering their respective application requirements.

BRIEF DESCRIPTION OF THE FIGURES

The invention is now described by way of example with reference to the accompanying figures in which.

DESCRIPTION OF PREFERRED EMBODIMENTS

The present invention is described herein with reference to a particular, advantageous embodiment. However, the invention is not limited in its applicability to such an embodiment, and may be more generally applied.

The invention is described herein with particular reference to an implementation in a software for internet applications (SOFIA) implementation. A block diagram of an exemplary SOFIA architecture is shown in FIG. 1, including a multimedia subsystem adapted in accordance with a preferred embodiment of the present invention.

It is assumed in the following discussion that the skilled reader is familiar with the well-known session initiation protocol (SIP), session description protocol (SDP) and other signalling protocols as discussed hereinbelow. The implementation of such protocols does not form part of the present invention in so far as such implementations are not described herein.

Figure 1:
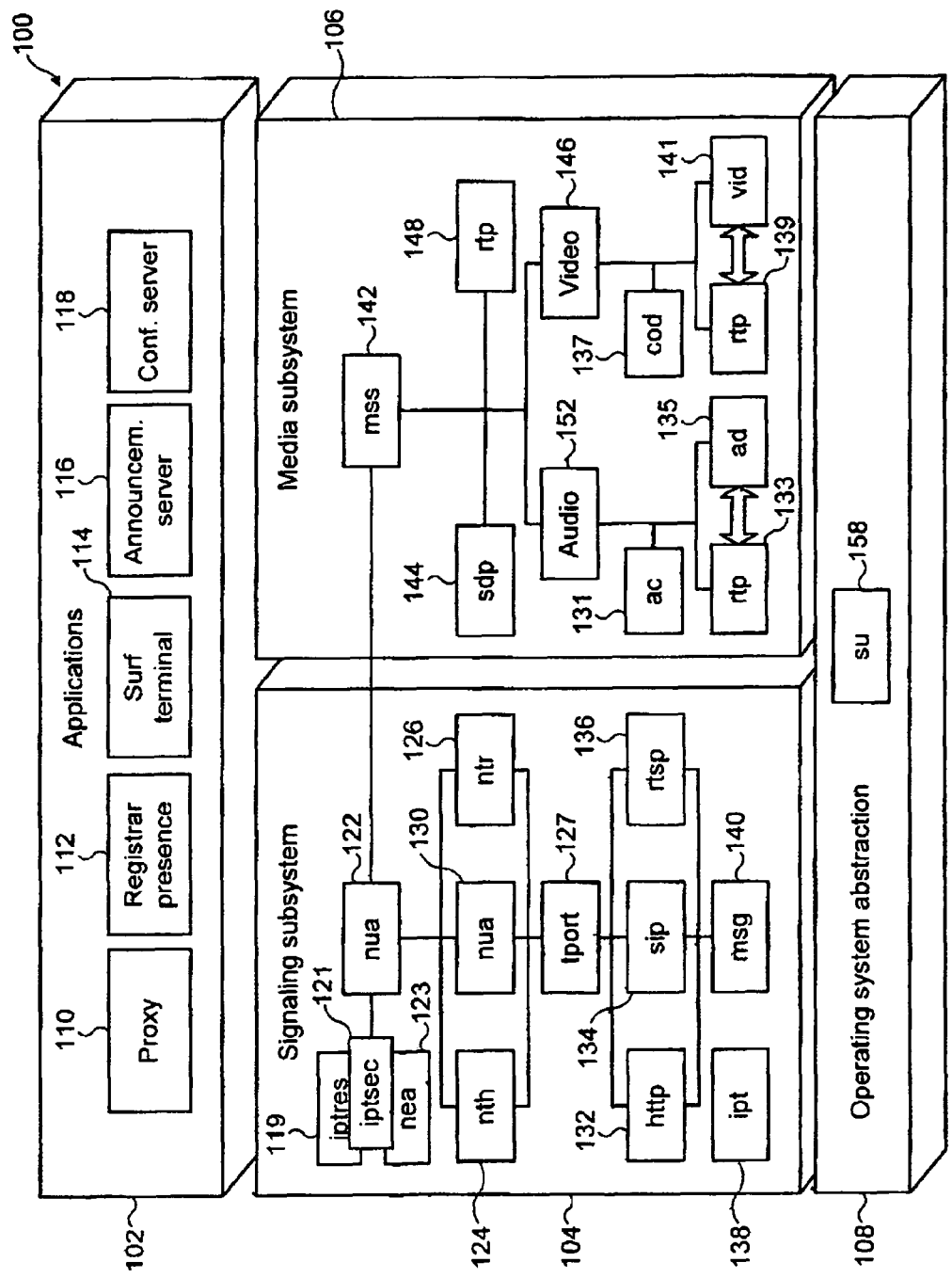
FIG. 1 shows in block diagram form an example architecture of a multimedia application.

Referring to FIG. 1, the SOFIA architecture includes a set of applications 102, a signalling subsystem 104, a media subsystem 106, and an operating system abstraction layer 108.

The applications 102 include, in the example shown, a proxy server application 110, a registrar/presence server application 112, a simple ubiquitous rich-call facilitator (SURF) server application 114, and media server applications such as announcement server 116 and conference server application 118.

The signalling subsystem 104 includes iptres, iptsec, and nea blocks 119, 121 and 123 respectively, a Nokia user agent API (NUA) 122, a Nokia Transaction API (NTA) 130, a nth 124, a ntr 126, a transport block 127, an IP telephony utility library (IPT) 138, a http block 132, a SIP block 134, a RTSP block 136, and a protocol independent message block (MSG) 140. The nea block 123 is a Nokia event API block. The NTA module 130 implements the SIP dialogs and transactions. The tport module 106 implements message transport. The sip module 134 provides syntax and encoding for different SIP headers. The msg module 108 provides generic SMTP-like abstract syntax and encoding primitives. The tport 106 and msg 108 modules can be shared by other protocols, like RTSP or HTTP.

The elements of the media subsystem 106 include a multimedia subsystem block 142, which realises the interface with the signalling subsystem 104, an SDP block 144 for defining session, media and codec descriptions, an RTP block 148 for transporting media over IP, and including a jitter buffer, packet video module 146 for video conferencing and an audio module 152. The audio module is further associated with an audio device 135, a codec 131, and an RTP block 133. The video module 146 is further associated with a codec 137, a video device 141, and an RTP block 139.

The operating system abstraction layer 108 includes an SU block 158 containing an SU library.

In FIG. 1, the signalling subsystem 104 may be considered to be a control part of the application, and the media subsystem may be considered to be a media part of the application.

A detailed description of a preferred embodiment of the present invention is given hereinbelow.

The NTA block 130 is an application programming interface (API) between an IPT application and a transaction-layer session initiation protocol (SIP) protocol engine. It should be noted that although the present invention is described by way of reference to a specific implementation which utilises the Nokia Transaction API, the skilled person reading the following description will appreciate that the functionality provided by the present invention may be more broadly applied.

A detailed description of a preferred embodiment of the present invention is given hereinbelow.

Internet multimedia applications may have several active media sessions. These sessions may include, for example, audio, video, whiteboard and other media. The multimedia applications, for example a voice over IP (VoIP) terminal, an announcement server, a conferencing server, or a public switched telephone network (PSTN) gateway, use and control media resources in the media sessions. Each of these applications needs to control the media resources by some means.

The present invention provides an improved application programming interface (API) to control media resources in numerous Internet multimedia applications. The API is independent of the application itself and the media resources underneath. For the purposes of the present description, the API is called a multimedia subsystem (MSS) interface.

Figure 2:
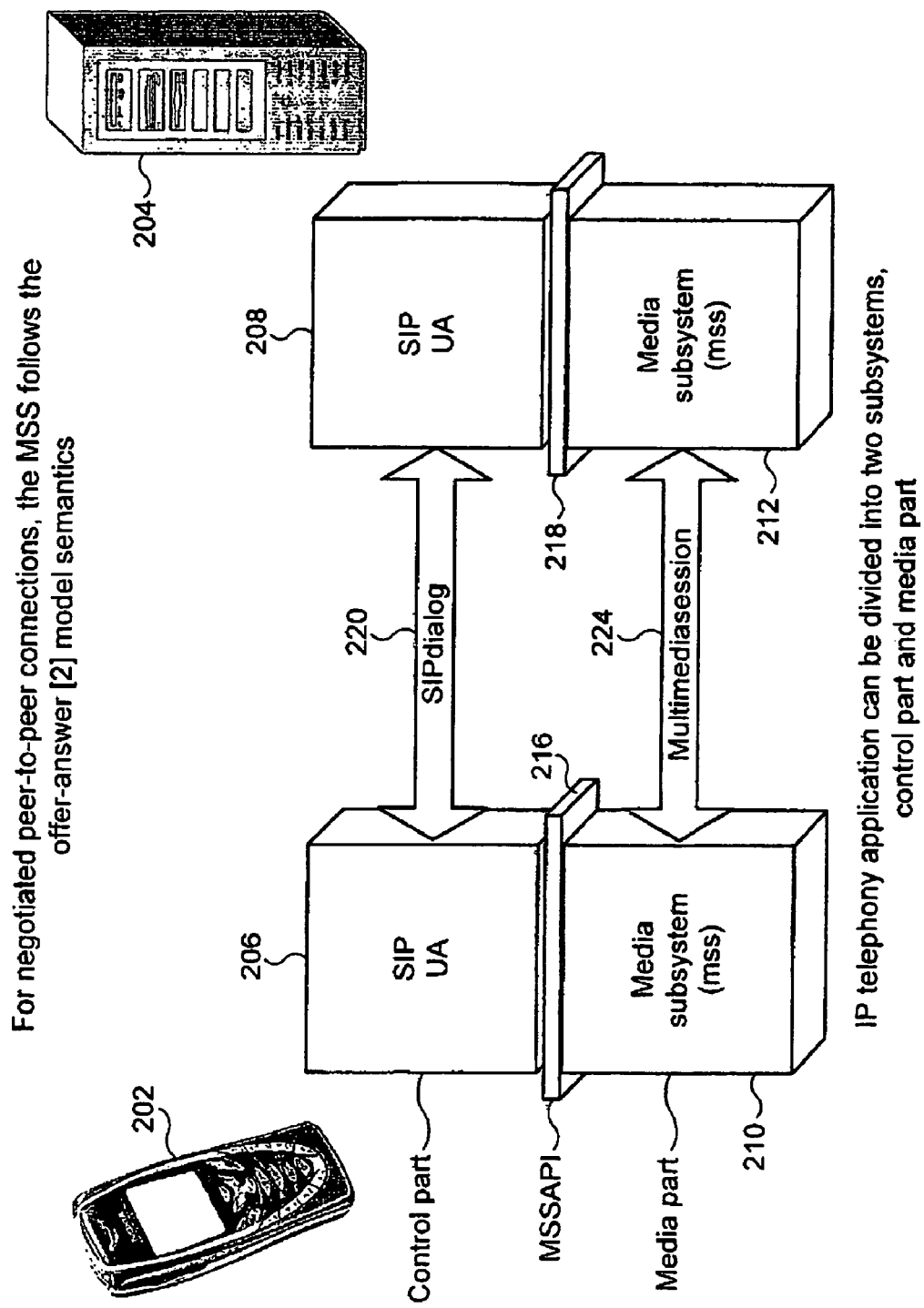
FIG. 2 shows in block diagram form the implementation of an exemplary embodiment of the present invention.

Referring further to FIG. 2, there are illustrated two multimedia applications between which a multimedia session is established. A first multimedia application is provided by a VoIP terminal 202, and a second multimedia application is provided by a server 204, such as a conferencing server.

In accordance with the present invention, each of the multimedia applications is provided with a control part and a media part. The first multimedia application 202 is provided with a control part 206 comprised of a session initiation protocol (SIP) user agent (UA), and media part 210 comprised of a media subsystem (MSS). The second multimedia application 204 is provided with a control part 208 comprised of a SIP UA, and media part 212 comprised of a MSS. Each of the multimedia applications 202 and 204 is also provided with a multimedia subsystem application programming interface (MSSAPI) between the respective control and media parts. The first multimedia application 202 includes a MSSAPI 216, and the second multimedia application includes a MSSAPI 208.

The SIP UAs of each of the first and second multimedia applications establish a SIPDialog there between, represented in FIG. 2 by communication 220. The MSSs 210 and 212 of the first and second applications establish a multimedia session there between, represented in FIG. 2 by communication 224.

As illustrated in FIG. 2, in accordance with the present invention the MSSAPI interfaces 216 and 218 provide a clean and consistent interface to the media resources for the control part of each multimedia application. Multimedia sessions can be created, copied, modified and terminated using the MSS API. The media API can follow different modes of operation: for multicast conferences (e.g. SAP) or unidirectional, non-negotiated (RTSP—real time stream protocol) media connections, in accordance with preferred embodiments of the present invention it is possible to specify a media session contents by giving a media description to the MSS. For negotiated peer-to-peer connections, the MSS may follow an offer-answer model semantics.

An Internet call may contain multiple mediums and connections. In accordance with a preferred embodiment of the present invention, the call components are described and negotiated using session description protocol (SDP) session descriptions. A session description protocol is basically a description language. There is an application of SDP known as the offer-answer model (RFC 3 mmm), which SIP user agents follow when they exchange SDP descriptions and negotiate the call contents.

The main elements of the multimedia subsystem 106 are shown in block diagram form in FIG. 1, and briefly described hereinabove.

Speech is carried over the Internet using a real-time transport protocol (RTP). Apart from speech, RTP can be used to carry other media, like video or high-quality audio. Real-time transport control protocol (RTCP) is used to monitor media delivery, synchronize different streams and provide minimal control and identification for multimedia streams.

The RTP is not a complete protocol by itself, but provides fundamental end-to-end delivery services for real-time data. The usage of the RTP feature greatly depends on the application profile and the media transmitted. The SOFIA RTP module follows an object-oriented approach, and it is designed to provide a virtual interface for the actual media-specific implementation.

The audio codec interface 131 and the audio device abstraction layer 135 are designed to interoperate smoothly with various RTP features. They are combined with RTP by a MSS audio stream implementation, termed mss_audio.

The multimedia subsystem 106 or media part is accompanied, as shown in FIG. 1, by a signalling subsystem 104 or control part, including a suitable signalling protocol such as SIP, RTSP, or SAP. For the media subsystem and the signalling subsystem to work together, some application logic (not shown) is also required.

The multimedia subsystem 210 is provided with the MSSAPI interface 216 in accordance with the invention for accessing media services. The interface methods and semantics are preferably based on RTSP. The interface is designed to be flexible, extensible, and easy to use. The interface preferably implements SDP semantics for different protocols, for example: bi-directional offer-answer model for unicast SIP, unicast streaming for RTSP, multicast for SAP as well as multicast SIP and multicast RTSP.

Despite different semantics, in accordance with the present invention the interface to the MSS always looks the same from the signalling protocol point of view.

The interface can also be used in a similar fashion to control very different kinds of media services. For example, the interface may be used to control both SURF audio/video terminal media sessions and the audio mixer and media sessions of a multipoint control unit. These two applications are in the opposite extremes on the basis of the application requirements. Again, the interface to the MSS looks the same from the signalling protocol point of view in either case. Using the MSS API features, such as the 'named parameters' feature discussed below, the application can control media semantics in a way transparent to the signalling protocol.

The MSS API allows both distributed or integrated implementation for media. Part of the media session can be implemented remotely. For instance, a separate video camera can be controlled via MSS API. Thus the interface does not apply just to connecting control and media parts of a single device, but may also apply to connecting a control device to a media device. The control protocol underneath the MSS API may be RTSP with some proprietary extensions.

In a preferable embodiment, the MSS interface may implement the SDP offer/answer model negotiation. The subsystem logic preferably takes care of configuring, creating and destroying multimedia sessions and media streams. The MSS sessions are described using SDP.

A preferred example implementation of the present invention is now described, in relation to an example using session description protocol (SDP) and further using the offer/answer model.

First, the MSS interface methods or primitives for this preferred example are shown in Table 1. All the event methods/primitives of Table 1, with the exceptions discussed hereafter, are obtained from RTSP. The event methods (event_bind, event_send) are additional to the RTSP methods/primitives. Further the pause method has been extended so that it can handle pausing separate splay or record) data streams. Otherwise, the methods work the same way as RTPS methods.

TABLE 1

| Method | Description |
| --- | --- |
| mss_create | create a mss object |
| mss_destroy | destroy a mss object |
| mss_get_status | get status |
| mss_announce | set local SDP |
| mss_describe | get local SDP |
| mss_setup | setup a session with local and remote SDP |
| mss_play | start playing |
| mss_record | start recording |
| mss_pause | stop play/record |
| mss_teardown | destroy a session |
| mss_setparams | set parameters |
| mss_getparams | get parameter values |
| mss_event_bind | bind the event handler |
| mss_event_send | send an event |

The MSS module 142 implements the MSS interface and the subsystem logic. The MSS module includes, in the preferred example, a SDP negotiation implementation according to the offer/answer model. The subsystem logic takes care of configuring, creating and destroying sessions. Each of these sessions is described with SDP.

As the interface of the preferred embodiment closely resembles RTSP semantics, implementing an RTSP server and client on top of the interface is trivial. Almost a one-to-one mapping can be used. This trait of the interface thus allows remote control of the media. This feature may be utilized with a distributed gateway in which the media gateway controller (MGC) controls the media gateway (MG) remotely via an RTSP protocol. Within the media gateway the RTSP protocol would be directly mapped to the MSS interface.

Using and configuring MSS is straightforward. In the following paragraphs the basic functionality of the interface in the preferred illustrative example is described.

The mss_setup( ) function is used to create a session from a predefined configuration. The configurations are identified by a path and thus several configurations can exist at the same time. The initial configuration is read from a local file, but can be altered afterwards with the mss_announce( ) function. The mss_announce( ) function can take a new local SDP as an argument. The SDP containing the active configuration can be fetched from the MSS with an mss_describe( ) function call. The local configuration can include mss-specific SDP parameters. These parameters are usually removed from the SDP as it is fetched with the mss_describe( ) function, so the active configuration can directly be used as an SDP offer.

A media session is created by calling mss setup( ). The function returns a session pointer ms_t, which is used in the subsequent calls. If the remote SDP is known, it is included in the creation call to mss_setup( ). mss_describe( ) is used to get the current local SDP from the MSS. If the remote SDP has been passed to the MSS, the local SDP is matched to that following the offer/answer model rules.

The MSS configurations advantageously preferably form a hierarchical tree (like a file system). The branch configurations may inherit features from trunk configurations. The configuration name may be a path like "/ipv6/loopback/audio-only".

Likewise, it is possible to address specific components within a session using hierarchical names. Audio RTP parameters may be accessed, for example, using the name prefix "audio/rtp", e.g., the RTP reception statistics can be accessed using path "audio/rtp/quality_info".

Using hierarchical naming schemes for configurations and objects beneath API facilitates building and adding new configuration objects in the API, and advantageously does not require changes in the application or MSS core.

Each MSS method can be accompanied with a list of parameters. Parameters are strings in form of: name "=" value. Parameters can modify or augment the semantics of MSS methods. For instance, a MCU application can provide the signalling protocol engine with a parameter telling the MSS to create a mixer session instead of an ordinary session associated with actual audio hardware. The SIP signalling protocol engine need not to be modified as the MSS does not do anything special from an SIP point of view. The MSS just creates a media session and returns an SDP offer or answer as required by SIP protocol semantics.

Figure 3:
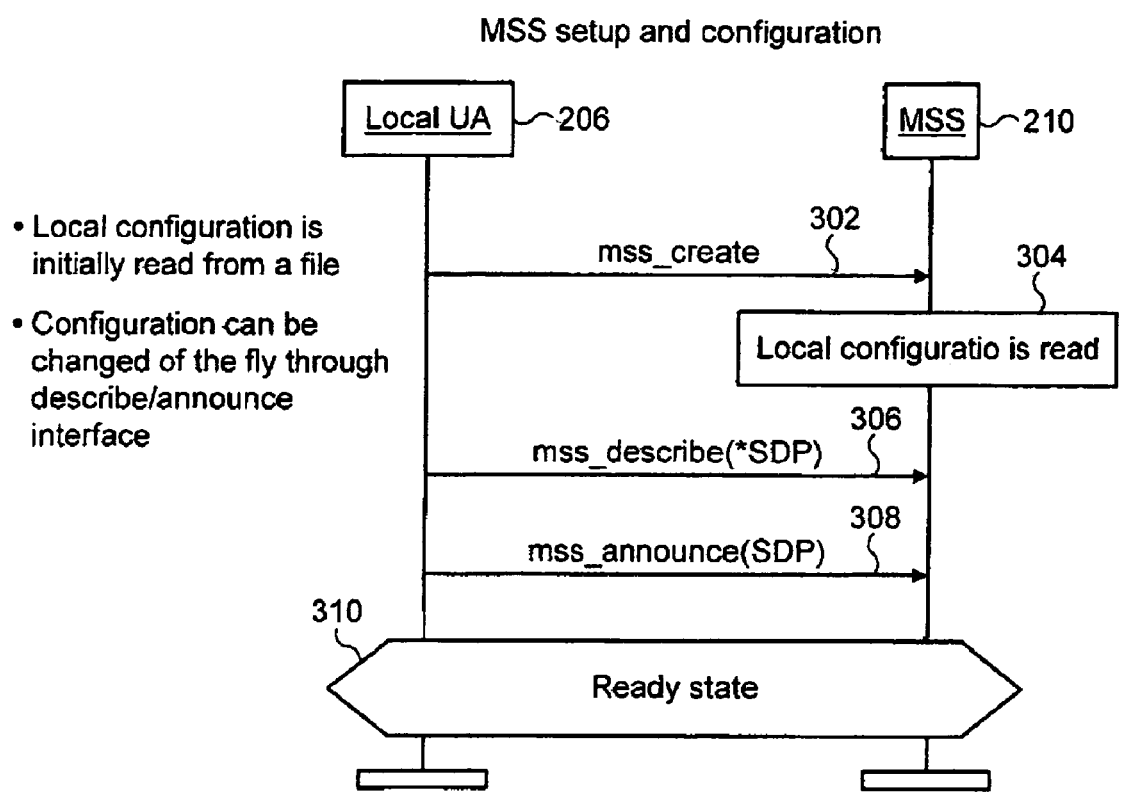
FIG. 3 shows a signalling chart illustrating a configuration in a multimedia subsystem in accordance with an embodiment of the present invention.

The setup and configuration of the multimedia subsystem for any multimedia application is illustrated by the signalling chart of FIG. 3, in which the local user agent (UA) is considered to be the UA 206 of the VoIP terminal 202 of FIG. 2, and the MSS is the MSS 210 of the VoIP terminal 202.

For every application, the method mss_create is initially called, as represented by signal 302 in FIG. 3. This signal creates an MSS object. As represented by clock 304, responsive to the method mss_create the local configuration of the local UA is read.

Responsive to a method mss_describe 306 from the control part of the local UA to the media part, the media part then returns the details of the local configuration previously read. The details of this local configuration may include information such as the codecs available to the application. Thus parameters are returned to the control part of the local UA.

The control part of the local UA 206 may then generate an mss_announce method, as represented by signal 308, to instruct the MSS to change certain parameters.

Thereafter, the application is in a ready state, as represented by block 310. In the ready state the application is ready to initiate a call, or to receive a call.

Figure 4:
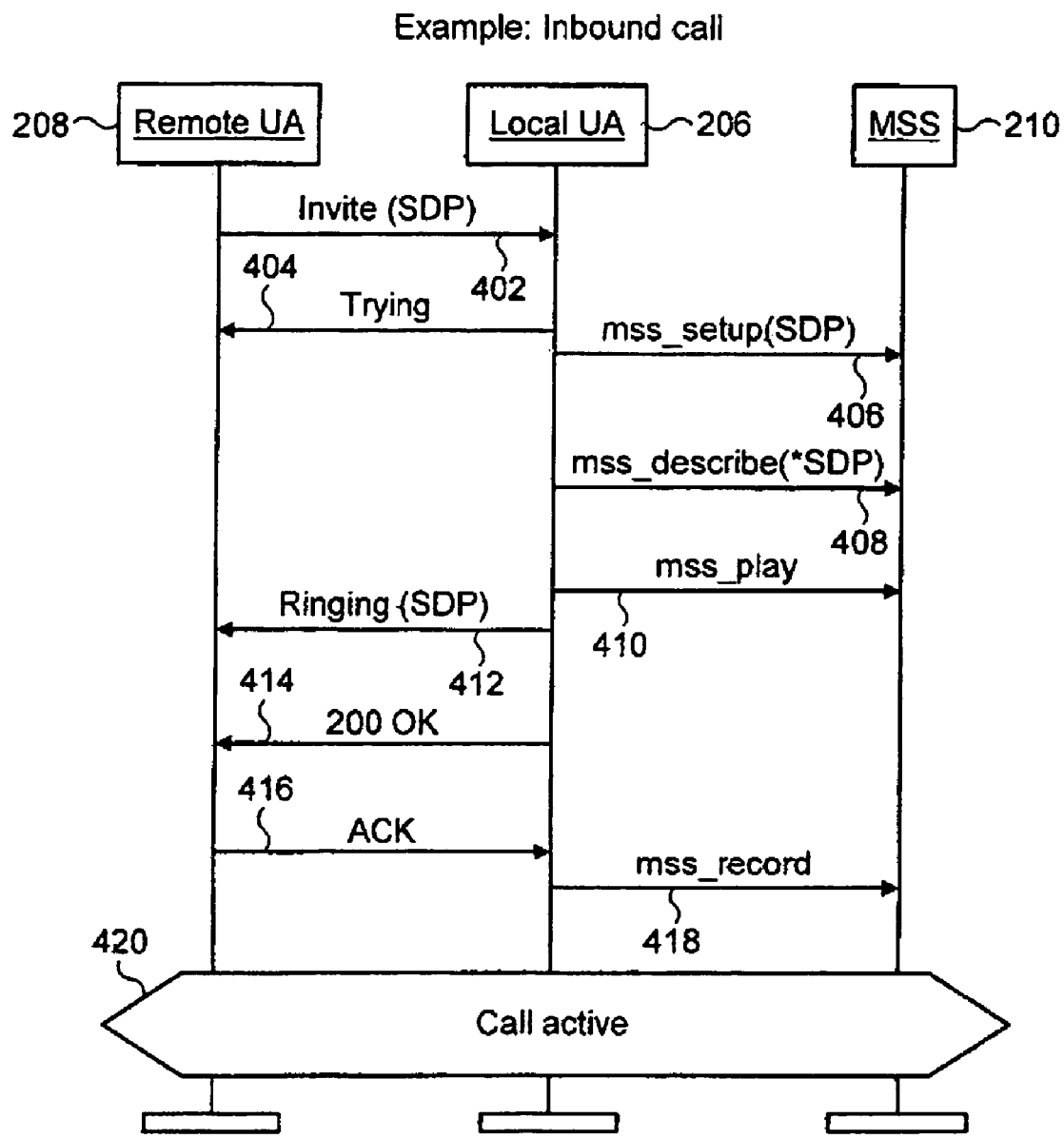
FIG. 4 shows a signalling chart illustrating a handling of an incoming call in a multimedia subsystem in accordance with an embodiment of the present invention.

Turning to FIG. 4, there is illustrated an example message sequence illustrating how an incoming SIP call is mapped to the MSS 210. In FIG. 4, a star '*' signifies a parameter that is returned by the call. In FIG. 4 the SIP UA 208 of the second multimedia application 204, the remote UA for the purposes of this description, is also illustrated.

An inbound INVITE SDP message 402 is received by the SIP UA 206 from the SIP US 208, which includes an SDP offer. This is an offer from the remote UA to establish a communication. Responsive to this offer, the local UA 206 transmits a TRYING signal 404 back to the remote UA, indicating that the offer is being processed.

The offer is passed to the MSS 210 by the SIP UA 206 as the media session is created by way of a call to mss_setup( ) method 406. The mss_setup method provides the SDP of the remote UA 208. That is, the local UA control part provides the local UA media part with a description of the session requested by the remote UA.

As described hereinabove with reference to FIG. 3, the local SDP is configured during setup, and is thus known by the MSS. The MSS 210 therefore compares the offered SDP to the local SDP. Thereafter, the MSS 210 effectively performs the negotiation of the offer answer. The MSS 210 identified those parts of the remote SDP and local SDP which are common, and responsive to the mss_describe method 408 returns the common SDP together with the local SDP to the local UA 206, as parameters.

Thus an answer is fetched from the MSS with a call to mss_describe( ) 408. Responsive to mss_describe, parameter(s) are returned to the local UA 206.

Responsive to receipt of the parameters, which effectively constitute agreement to the offer by the MSS, the local UA initiates an mss_play method 410. The mss_play method activates the MSS ready for a media communication.

The mss_play( ) method 410 is preferably issued straight away, since the MSS is preferably prepared to receive a media stream.

Thereafter, the local UA further communicates with the remote UA. The local UA 206 returns a RINGING SDP signal 412 to the remote UA 208, including the session description determined by the MSS and returned responsive to the mss_describe method. A 200 OK signal 414 is also sent to the remote UA 208.

Thereafter, the remote UA performs similar steps to that described above, and which are further described hereinafter with reference to FIG. 5. Once the remote UA determines that the session description is satisfactory, the remote UA returns an acknowledgement signal ACK 416 to the local UA 206. Responsive thereto, the local UA invokes a mss record method to the MSS 210, and the MSS is thus fully enabled to receive the inbound call.

All of the above communication between the local UA 206 and the remote UA 208 takes place on the SIPDialog link 220 (see FIG. 2). Once this control exchange is complete, as represented by block 420 in FIG. 4 the call is active, and communication takes place between the media subsystems 210 and 212 on link 224.

Figure 5:
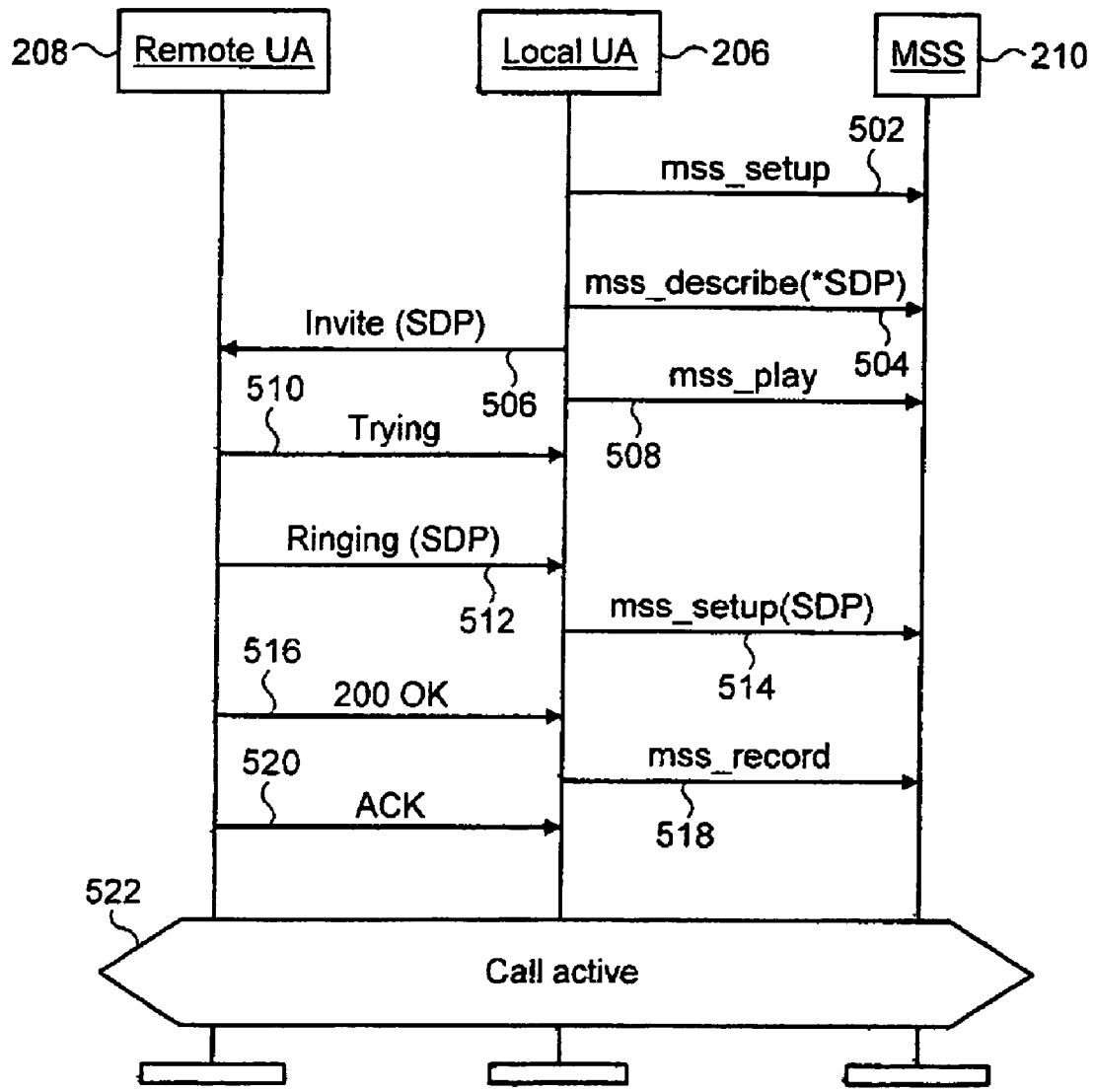
FIG. 5 shows a signalling chart illustrating a handling of an outgoing call in a multimedia subsystem in accordance with an embodiment of the present invention.

FIG. 5 is an example message sequence illustrating how an outbound call is mapped to the MSS 210. As in FIG. 4, there is illustrated the local UA 206 and its associated MSS 210, and a remote UA 208. All signalling between the local UA and the remote UA is via the communication links 220.

As with the case of an incoming call shown in FIG. 4, in the case of outbound call the first communication between the local UA 206 and its associated MSS 210 is an mss_setup method 502. However in this instance, mss_setup( ) is called without receipt of a remote SDP. Responsive to the mss_setup, the MSS gets the current local SDP information, and such information is fetched by the local UA responsive to an mss_describe method 504. The local SDP information forms the basis of the offer in making the call.

The local UA then makes an offer to the remote UA by transmitting an INVITE (SDP) signal 506. The mss_play( ) method 508 is preferably called at this point, in order to activate the MSS 210

As described in FIG. 4, responsive to the INVITE signal 506, the other party responds with a provisional response such as a TRYING message 510.

The remote UA 208 then follows a simple set of steps as described above with reference to FIG. 4, and issues a RINGING message 512. Responsive to the RINGING message 512, which includes the SDP (the negotiated session description provided by the remote UA), the local UA provides the session description to the MSS 210 by invoking a mss_setup method, including the necessary SDP description.

Thereafter, the local UA receives the 200 OK message 516, equivalent to the message 414 in FIG. 4. The 200 OK message indicates that the call can be established, and responsive thereto the local UA 206 issues a mss_record method 518 to the MSS, to fully activate for communication on link 224.

The exchange of control is completed by the local UA generating an acknowledgement message ACK 520 to the remote UA, equivalent to the message 416 in FIG. 4.

As discussed with relation to FIG. 1, the SDP module implements a SDP protocol parser. This module is also utilized in the signalling subsystem 104.

It will be apparent from the description of the above example scenarios that various modifications to the invention are possible. The invention, and embodiments thereof, provides several advantages, some of which are stated hereinafter.

In preferred embodiments, the invention advantageously provides for RTSP-like interface primitives. Advantageously, semantics may be compatible with signalling protocols such as SIP, RTSP, or SAP.

The invention provides a simple mapping from signalling protocol to media API.

The invention supports an offer/answer negotiation model.

Advantageously, parameters are used to modify the basic functionality, which parameters are preferably transparent to the signalling engine.

The event delivery between the application and media sessions is advantageously transparent and extensible without modifications to the MSS. Events are preferably identified by a hierarchical text formatted path that can be easily processed by applications. Event data type is transparent to the API.

The suitability of the interface in accordance with the present invention to several application types reduces cost, as it is suitable for terminals, servers, and gateways.

Maintaining single media API for several applications also provides cost reductions.

Use of a simple and straightforward API also provides cost reductions.

The application and signalling protocol does not need to differentiate between unicast and multicast sessions.

The same interface can be used on various operating systems, such as Windows and Linux, thus saving cost.

Adding new media processing capabilities underneath the API does not require changes in: the application; the signalling protocol implementation; or the API itself.

The invention enables media processing capability to be supplied as a library utilizing this interface. This media-processing library can be distributed and updated independent of the application, thus saving cost.

It should be understood that whilst the examples described hereinabove relate to an offer-answer type scenario, the invention is not limited to such a scenario. The invention may be used in an offer only type scenario, for example, and there may be further scenarios within which the invention would be applicable.

Furthermore, the invention has been described herein by way of reference to particular examples using SDP. The invention is not limited to SDP, and other protocols may be used. SDP is advantageously used in preferred embodiments because it represents an efficient way for communicating information descriptive of a session.

The use of SDP for configuration is advantageous, as it allows named configurations. No special configuration editor is thus needed, reducing complexity of any implementation, and cost.

An alternative implementation may, for example, be a high-level language such as extensible mark-up language (XML).

The invention is also not limited, as discussed above, to scenarios where the control or signalling subsystem and the media subsystem are part of the same device. The invention is applicable to scenarios where the control and media parts are provided as separate devices, or part of separate devices.

Whilst the present invention has been described herein by way of reference to particular examples, it is not limited to those examples. The scope of the invention is defined by the attached claims.

The invention claimed is:

1. A method, comprising:
controlling at least one of a plurality of media resources in a multimedia application of a media device via an application programming interface, wherein the application programming interface interfaces a control part of the multimedia application and a media part of the media application, wherein the control part provides a signaling protocol, the control part comprising a session initiation protocol module providing syntax and encoding for session initiation protocol messages, wherein the control part further comprises a message transport module providing syntax and encoding for messages being handled by the control part, and wherein the media part comprises a session description protocol module for defining media sessions, and wherein the media part further comprises a codec for at least one of video and audio of the defined media sessions, and wherein the application programming interface is independent from the media resources being controlled,
wherein the media device is a handheld terminal, wherein the controlling comprises:
communicating, via the application programming interface, from the control part of the multimedia application using the signaling protocol, and
creating the defined media sessions by interfacing, via the application programming interface, between the control part and the media part of the media application using offer-answer semantics, the offer-answer semantics being independent of the signaling protocol.

2. The method according to claim 1, wherein the independence of the application programming interface enables the application programming interface to operate with other media applications providing other resources.

3. The method according to claim 2, further comprising:
receiving at the media part from the control part, a signal identifying the characteristics of the media session.

4. The method according to claim 3, further comprising:
responsive to said signal determining by the media part whether the media session is to be supported.

5. The method according to claim 4, further comprising:
determining by the media part characteristics of support for the media session.

6. The method according to claim 5, further comprising:
determining the characteristics of said support by the characteristics of the media session in the received signal and the characteristics of the media part capability.

7. The method according to claim 3, further comprising:
basing the signal identifying the characteristics of the media session on a session description protocol.

8. The method according to claim 3, further comprising:
communicating between the control part of the media application and a remote device using the signaling protocol; and
generating said signal by said media application responsive to a request for the media session for a remote media application of the remote device.

9. The method according to claim 8, further comprising:
basing said request on a session description protocol.

10. The method according to claim 3, further comprising:
generating said signal by said control part responsive to the media session being initiated by the control part.

11. The method according to claim 1, further comprising:
identifying the media part configurations and objects using a hierarchical naming scheme.

12. The method according to claim 1, further comprising: configuring the media session to be either a multicast session or a unicast session.

13. The method according to claim 1, further comprising: associating the media application with at least one of a Windows or Linux operating system.

14. The method according to claim 1, wherein the application program interface enables control based on methods comprising a create, a destroy, an event bind, and an event send to enable a peer-to-peer connection between the handheld terminal and a server, wherein each of the handheld terminal and the server include the same application program interface.

15. The method according to claim 1, wherein the at least one of a plurality of media resources are dependent upon characteristics of a media session.

16. An apparatus, comprising: at least one processor; at least one memory, wherein the at least one processor and the at least one memory provide operations comprising:
controlling at least one of a plurality of media resources in a multimedia application of a media device via an application programming interface, wherein the application programming interface interfaces a control part of the multimedia application and a media part of the media application, wherein the control part provides a signaling protocol, the control part comprising a session initiation protocol module providing syntax and encoding for session initiation protocol messages, wherein the control part further comprises a message transport module providing syntax and encoding for messages being handled by the control part, and wherein the media part comprises a session description protocol module for defining media sessions, and wherein the media part further comprises a codec for at least one of video and audio of the defined media sessions, and wherein the application programming interface is independent from the media resources being controlled,
wherein the media device is a handheld terminal,
wherein the controlling comprises:
communicating, via the application programming interface, from the control part of the multimedia application using the signaling protocol, and
creating the defined media sessions by interfacing, via the application programming interface, between the control part and the media part of the media application using offer-answer semantics, the offer-answer semantics being independent of the signaling protocol.

17. The apparatus of 16, wherein the media part is configured to receive a signal from the control part identifying characteristics of the media session.

18. The apparatus of 17, wherein the media part is configured to be responsive to said signal to determine whether the media session is to be supported.

19. The apparatus of 18, wherein the media part is configured to determine characteristics of the support required for the media session.

20. The apparatus of 19, wherein the characteristics of said support are configured to be determined by the characteristics of the media session in the received signal and the characteristics of the media part capability.

21. The apparatus of 17, wherein the signal identifying the characteristics of the media session is based on a session description protocol.

22. The apparatus of 17, wherein said control part is configured to communicate with a remote device using the signaling protocol;
said signal is configured to be generated by said control responsive to a request for a media session from a remote media application of the remote device.

23. The apparatus of 22, wherein said request is based on a session description protocol.

24. The apparatus of 17, wherein said signal is configured to be generated by said control part responsive to a media session being initiated by the control part.

25. A non-transitory computer readable medium, encoded with instructions that, when executed on a computer, perform operations comprising:
controlling media resources in a multimedia application of a media device via an application programming interface, wherein the application programming interface interfaces a control part of the multimedia application and a media part of the media application, wherein the control part provides a signaling protocol comprising, the control part comprising a session initiation protocol module providing syntax and encoding for session initiation protocol messages, wherein the control part further comprises a message transport module providing syntax and encoding for messages being handled by the control part, and wherein the media part comprises a session description protocol module for defining media sessions, and wherein the media part further comprises a codec for at least one of video and audio of the defined media sessions, and wherein the application programming interface is independent from the media resources being controlled, the media device being a handheld terminal;
communicating from a control part of the application using a signaling protocol; and
creating the defined media sessions by interfacing between the control part and a media part of the application using offer-answer semantics, the offer-answer semantics being independent of the signaling protocol.

* * * * *